(12) United States Patent
Jankowski et al.

(10) Patent No.: US 7,993,785 B2
(45) Date of Patent: Aug. 9, 2011

(54) MEMS-BASED FUEL CELLS WITH INTEGRATED CATALYTIC FUEL PROCESSOR AND METHOD THEREOF

(75) Inventors: Alan F. Jankowski, Livermore, CA (US); Jeffrey D. Morse, Martinez, CA (US); Ravindra S. Upadhye, Pleasanton, CA (US); Mark A. Havstad, Davis, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1374 days.

(21) Appl. No.: 10/612,226

(22) Filed: Jul. 1, 2003

(65) Prior Publication Data
US 2004/0072039 A1 Apr. 15, 2004

Related U.S. Application Data

(60) Provisional application No. 60/393,218, filed on Jul. 1, 2002, provisional application No. 60/393,219, filed on Jul. 1, 2002.

(51) Int. Cl.
*H01M 8/06* (2006.01)
(52) U.S. Cl. ........ 429/423; 429/416; 429/433; 429/434; 429/465; 429/484; 429/488; 429/489
(58) Field of Classification Search ............. 429/19, 429/34
See application file for complete search history.

(56) References Cited

U.S. PATENT DOCUMENTS

| | | | |
|---|---|---|---|
| 4,365,007 A * | 12/1982 | Maru et al. | 429/19 |
| 5,082,751 A | 1/1992 | Reichner | |
| 5,227,258 A * | 7/1993 | Ito et al. | 429/40 |
| 5,733,675 A | 3/1998 | Dederer et al. | |
| 5,763,114 A | 6/1998 | Khandkar | |
| 6,033,794 A | 3/2000 | George et al. | |
| 6,077,620 A * | 6/2000 | Pettit | 429/26 |
| 6,200,696 B1 | 3/2001 | Farooque | |
| 6,268,077 B1 * | 7/2001 | Kelley et al. | 429/33 |
| 6,454,978 B1 * | 9/2002 | Thielman | 264/104 |
| 6,777,118 B2 * | 8/2004 | Shioya | 429/19 |
| 7,077,643 B2 * | 7/2006 | Holladay et al. | 431/215 |
| 2002/0031458 A1 | 3/2002 | Hirata | |
| 2003/0003332 A1 * | 1/2003 | Sederquist et al. | 429/19 |
| 2003/0044674 A1 * | 3/2003 | Mallari et al. | 429/44 |
| 2003/0232230 A1 * | 12/2003 | Carter et al. | 429/32 |
| 2004/0151955 A1 * | 8/2004 | Keskula et al. | 429/13 |

FOREIGN PATENT DOCUMENTS

| | | |
|---|---|---|
| EP | 0807321 | 12/1995 |
| WO | WO 96/38871 | 12/1996 |
| WO | WO 99/17390 | 4/1999 |
| WO | WO 00/45457 | 3/2000 |
| WO | WO 01/09968 | 2/2001 |
| WO | WO0241425 | * 5/2002 |

OTHER PUBLICATIONS

P. Vernoux et al, Gradual Internal Methane Reforming in Intermediate-Temperature Solid-Oxide Fuel Cells, J. Electrochem Soc., vol. 145 No. 10 Oct. 1998.

* cited by examiner

*Primary Examiner* — Cynthia Lee
(74) *Attorney, Agent, or Firm* — Eddie E. Scott; James S. Tak (57) ABSTRACT

Described herein is a means to incorporate catalytic materials into the fuel flow field structures of MEMS-based fuel cells, which enable catalytic reforming of a hydrocarbon based fuel, such as methane, methanol, or butane. Methods of fabrication are also disclosed.

33 Claims, 8 Drawing Sheets

MEMS-BASED FUEL CELLS WITH INTEGRATED CATALYTIC FUEL PROCESSOR AND METHOD THEREOF

The present invention relates to and claims priority under 35 USC 120 to Provisional Application No. 60/393,218 filed Jul. 1, 2002 and Provisional Application No. 60/393,219 filed Jul. 1, 2002, which are hereby incorporated by reference in there entirety.

The United States Government has rights in this invention pursuant to Contract No. W-7405-ENG-48 between the United States Department of Energy and the University of California for the operation of Lawrence Livermore National Laboratory.

BACKGROUND

U.S. patent application Ser. No. 09/241,159, filed Feb. 4, 1999, and issued as U.S. Pat. No. 6,638,654 on Oct. 28, 2003, assigned to the same assignees is hereby incorporated by reference. Pending U.S. patent application Ser. No. 09/241,159 describes a MEMS-based fuel cell as comprising electrode/catalyst/electrolyte materials formed on a micromachined silicon chip which enables the combination of a fuel and oxidant at elevated temperatures to produce continuous electric current. The MEMS-based fuel cell can be either a Solid Oxide (SOFC), Solid Polymer (SPFC), or Proton Exchange Membrane Fuel Cell (PEMFC).

SUMMARY OF THE INVENTION

An aspect of the invention includes a method comprising: forming a fuel cell stack having a pair of electrodes including an anode and a cathode, and a thin film electrolyte disposed therebetween, wherein the electrolyte comprises a solid oxide; and forming a catalyst proximate the anode, the catalyst adapted to reform a fuel, wherein a distance between the anode and the catalyst is less than 1 millimeter.

Another aspect of the invention includes a method comprising: forming a fuel cell stack having a pair of electrodes including an anode and a cathode, and a thin film electrolyte disposed therebetween, wherein the electrolyte comprises a solid oxide; integrating a catalytic microreactor with the fuel cell stack, wherein the catalytic microreactor comprising (1) a manifold disposed in fluid communication with the fuel cell stack, the manifold adapted to convey a fuel to the anode and (2) a catalyst adapted to reform the fuel.

A further aspect of the invention includes An apparatus comprising: a fuel cell stack having a pair of electrodes including an anode and a cathode, and a thin film electrolyte disposed therebetween, wherein the electrolyte comprises a solid oxide; and a catalyst disposed proximate the anode, the catalyst adapted to reform a fuel, wherein a distance between the anode and the catalyst is less than 1 millimeter.

Another aspect of the invention includes an apparatus comprising: a fuel cell stack having a pair of electrodes including an anode and a cathode, and a thin film electrolyte disposed therebetween; wherein the electrolyte comprises a solid oxide; and a catalytic microreactor having (1) a manifold positioned in fluid communication with the fuel cell stack, the manifold adapted to convey a fuel to the anode and (2) a catalyst adapted to reform the fuel.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION

A Microelectromechanical System (MEMS)-based thin-film fuel cell or stack of fuel cells of either a solid oxide fuel cell (SOFC), a solid polymer fuel cell (SPFC), or a proton exchange membrane fuel cell (PEMFC), utilizing electrode/catalyst/electrolyte or electrode/electrolyte materials which enable the combination of a fuel and oxidant at elevated temperatures to produce continuous electric current is described in U.S. patent application Ser. No. 09/241,159, now U.S. Pat. No. 6,638,654. Fuel manifolds and microflow channels are formed in the host structure/substrate by MEMS-based technology and the electrode/electrolyte/electrode, with or without catalyst layers are formed along with resistive heaters and integrated control circuitry by thin-film deposition technology and microfabrication approaches in combination with MEMS fabrication techniques. Thus, a miniature power source comprised of fuel cells which yield zero emissions (when operated on hydrogen and air) is disclosed. The electrical current generated from each cell is drawn away with an interconnect and support structure integrated with the gas manifold. The strengths of microelectronics, fabrication, micromachining approaches, and microelectro-mechanical systems technology are combined with thin-film deposition techniques for the purpose of producing a MEMS-based, thin-film miniature fuel cell. The MEMS-based fuel cell uses materials that are flexible and therefore can utilize either a solid oxide, solid polymer, or proton exchange membrane electrolyte material system.

A fuel cell stack has been fabricated which utilizes thin film electrodes, catalysts, and ion-conducting layers deposited by physical vapor deposition techniques. The stack has been patterned with electrical connections using standard microfabricaton techniques and subsequently formed into freestanding or supported membranes by micromachining away the silicon substrate. Manifold structures have further been fabricated through silicon micromachining techniques.

Stand-alone, single thin-film solid oxide fuel cells (TF-SOFCS) have been synthesized through multilayer and thin film vacuum deposition technology. (See A. F. Jankowski et al., Mat Res. Soc. Symp. Proc., Vol. 496, pp 155-158, 1998 Material Research Society; and U.S. Pat. No. 5,753,385, issued May 19, 1998 to A. F. Jankowski.) The ability to design and build a single MEMS-based fuel cell module suitable for assembly into a fuel cell stack is disclosed. Development of a usable substrate platform for cell stacking is seen in microelectronic processing of, for example, silicon wafers. The Si wafers are patterned using photolithography and etch processing to yield select areas of thin nitride windows that served as the substrate for deposition of the anode-electrolyte-cathode trilayer. Additional approaches can utilize a host structure/substrate having controlled porosity on which the fuel cell electrode/catalyst/electrolyte layers are deposited. This host structure having controlled porosity is then bonded on top of, mechanically sealed to, or formed within the silicon (or other material) substrate through which the flow channels have been etched. A solid oxide fuel cell (SOFC) trilayer example, similar to that shown in FIGS. 1 and 2, has been fabricated based on yttria-stabilized zirconia (YSZ) beginning with deposition of a nickel (Ni) layer and concluding with a silver (Ag) layer. Following deposition of the basic trilayer structure, the nitride window, if present, can be removed by plasma etching or other selective etching techniques. Creation of a multiple cell stack may be pursued, for example, using the Ni—YSZ—Ag trilayers or other solid oxide based trilayers. The Si-based substrates are used to build the individual TFSOFCs, for example, and use this platform to provide integration of the circuitry, resistive heaters, and required fuel and oxidant manifolding through microflow channel and MEMS fabrication technology. The patterned circuitry provides for controlled power output from each cell as well as a controlled heating of individual fuel cell elements. The MEMS processes allow individual control of gas flow to each cell through use of microvalves as well as the ability to control and regulate gas pressure or fuel flow throughout the device. Provision capabilities exist for incorporation of materials for the electrode, catalyst and electrolyte interface that optimize performance at lower temperatures by reducing resistive losses along with alternative materials that are suitable for high-temperature internal fuel reforming. The substrate platform enables modular cell assembly providing a capability for servicing and cell upgrade, as well as scaling of voltage.

Sectrode structures monolithically, and distribute fuel to the entire stack without the need for bulky complex manifolding. Furthermore, since the stack is now only a small percentage of the mass of the entire structure, appropriate thermal design of the fuel cell device, package, and resistive heating elements will allow efficient, low power heating of the stacks.

A completely fabricated fuel cell module with an integrated heating element, with the fuel cell stack free standing membranes has been tested. The silicon substrate was selectively etched with potassium hydroxide using patterned silicon nitride as the mask to form the window therein. Manifold channels were etched in a silicon substrate utilizing similar techniques. These components were ultimately bonded together, such as illustrated in FIG. 1, to form a fuel cell module having inlet and outlet channels with approximately 50 μm by 200 μm openings for fuel delivery.

Figure 4:
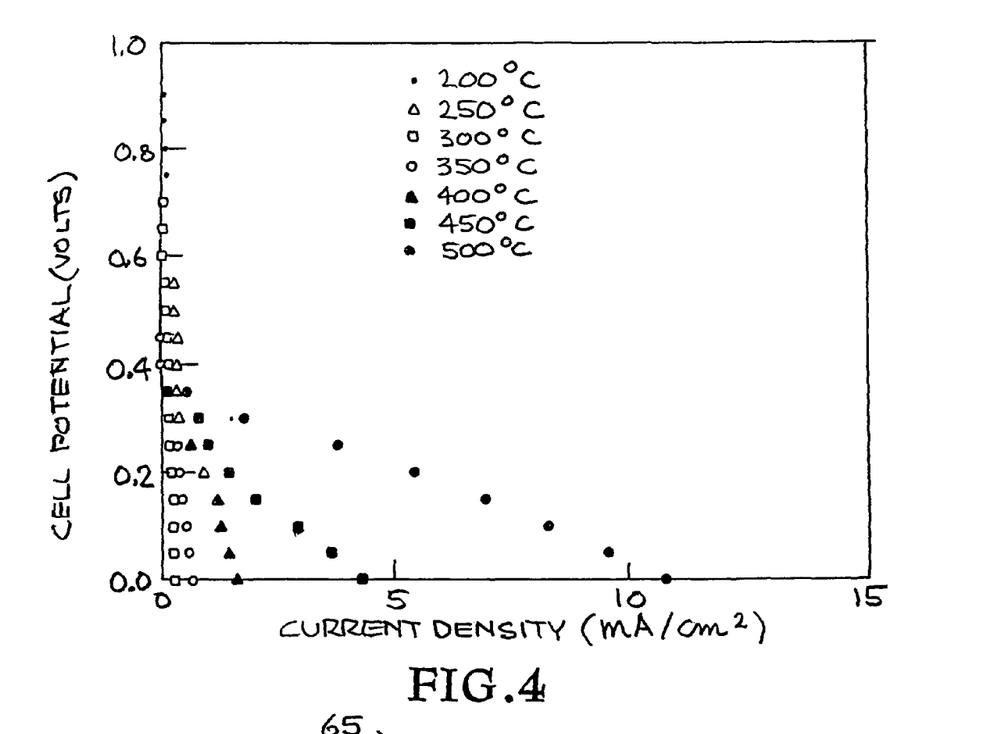
FIG. 4 graphically illustrates results of initial testing of the miniature fuel cell.

Initial testing of fuel cell structures consisted of a glass tube which can be epoxied to the backside of the fuel cell stack to deliver hydrogen gas diluted to 3% concentration with helium. The oxygen source was simply air on the top side of the structure. Bond wires were attached to the anode and cathode electrode pads, and an electrometer was utilized to monitor the potential voltage drop across the stack and subsequent current output as a function of temperature. Initial results of this testing are illustrated in FIG. 4. While not optimal, these results exhibit the expected over potential for this electrolyte materials system with no output current, along with increasing current output as temperature increases. While the output current densities are low, inherent limitations are present in fuel cell performance resulting from the high density of the nickel electrode layer. Thus, while fuel can readily diffuse through the nickel film to the electrolyte interface, the by-product of the electrochemical reaction, water, is unable to diffuse away from the interface, resulting in limited efficiency of the fuel cell.

The above-discussed problem involving the nickel layer has been overcome by the use of porous nickel electrode structures, thereby eliminating the effects of water vapor trapped at the electrolyte interface. Also, alternate electrolyte materials, such as other solid oxides, solid polymers and proton exchange membrane materials being tested in place of the YSZ electrolyte of the initial tested fuel cells. These improvements are described in greater detail with respect to FIGS. 5 and 6.

Figure 1:
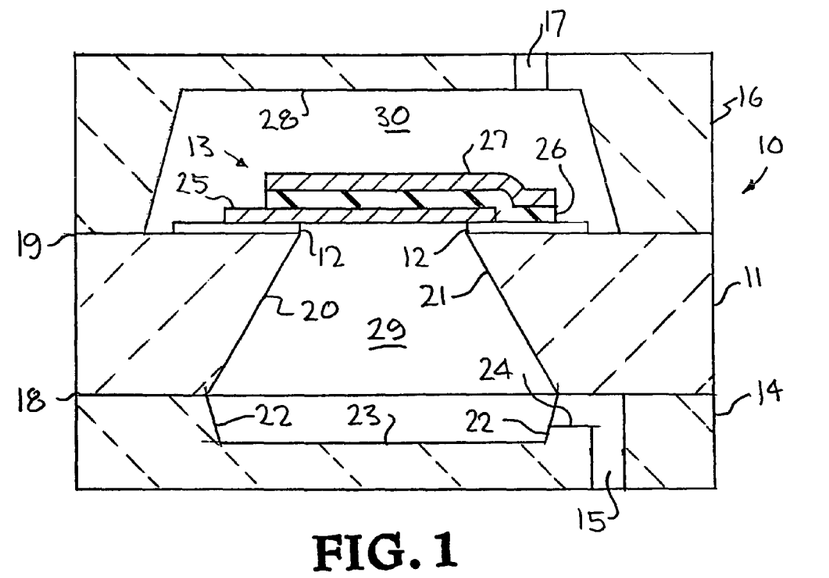
FIG. 1 is a cross-sectioned view of an embodiment of a miniature MEMS-based thin-film fuel cell of the invention.
Figure 2:
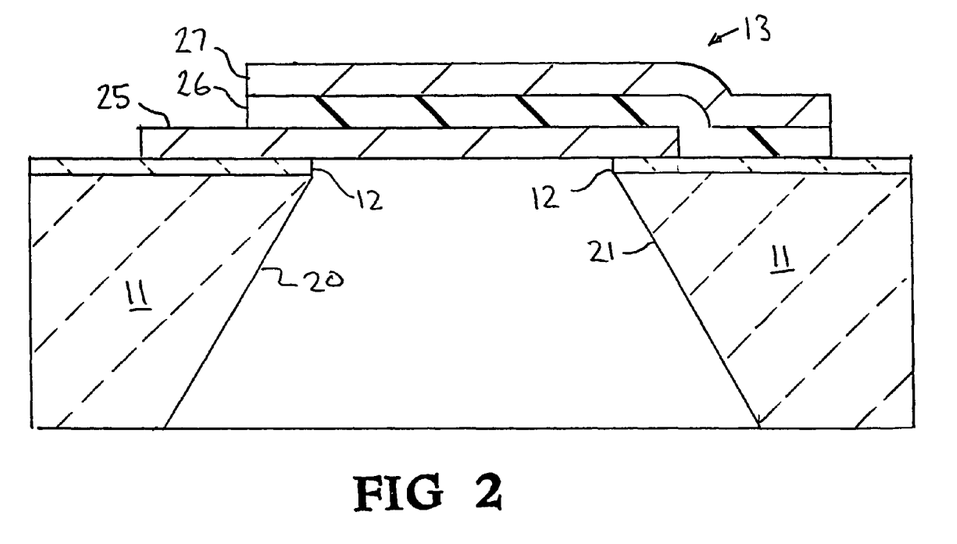
FIG. 2 is an enlarged cross-section of an upper section of the FIG. 1 embodiment.
Figure 5:
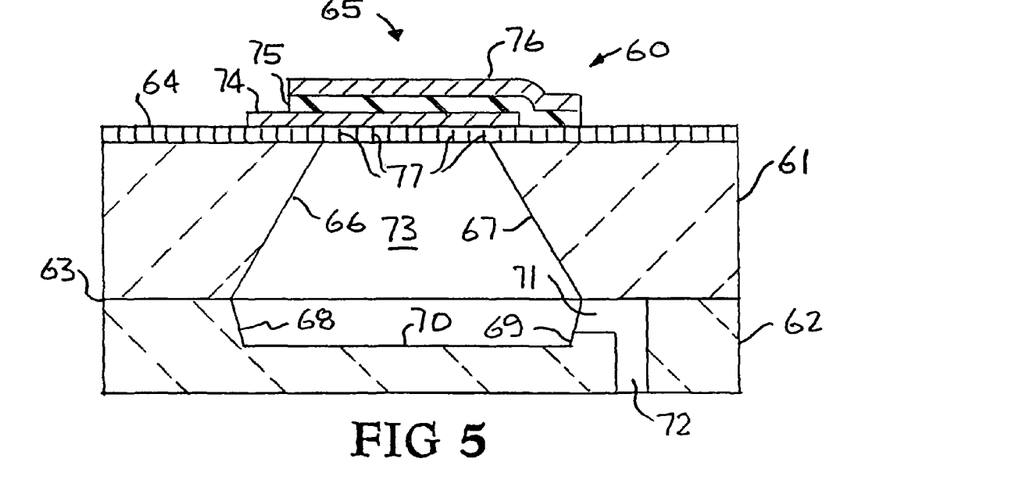
FIG. 5 is a cross-sectional view of another embodiment of the thin-film fuel cell made in accordance with the present invention.
Figure 6:
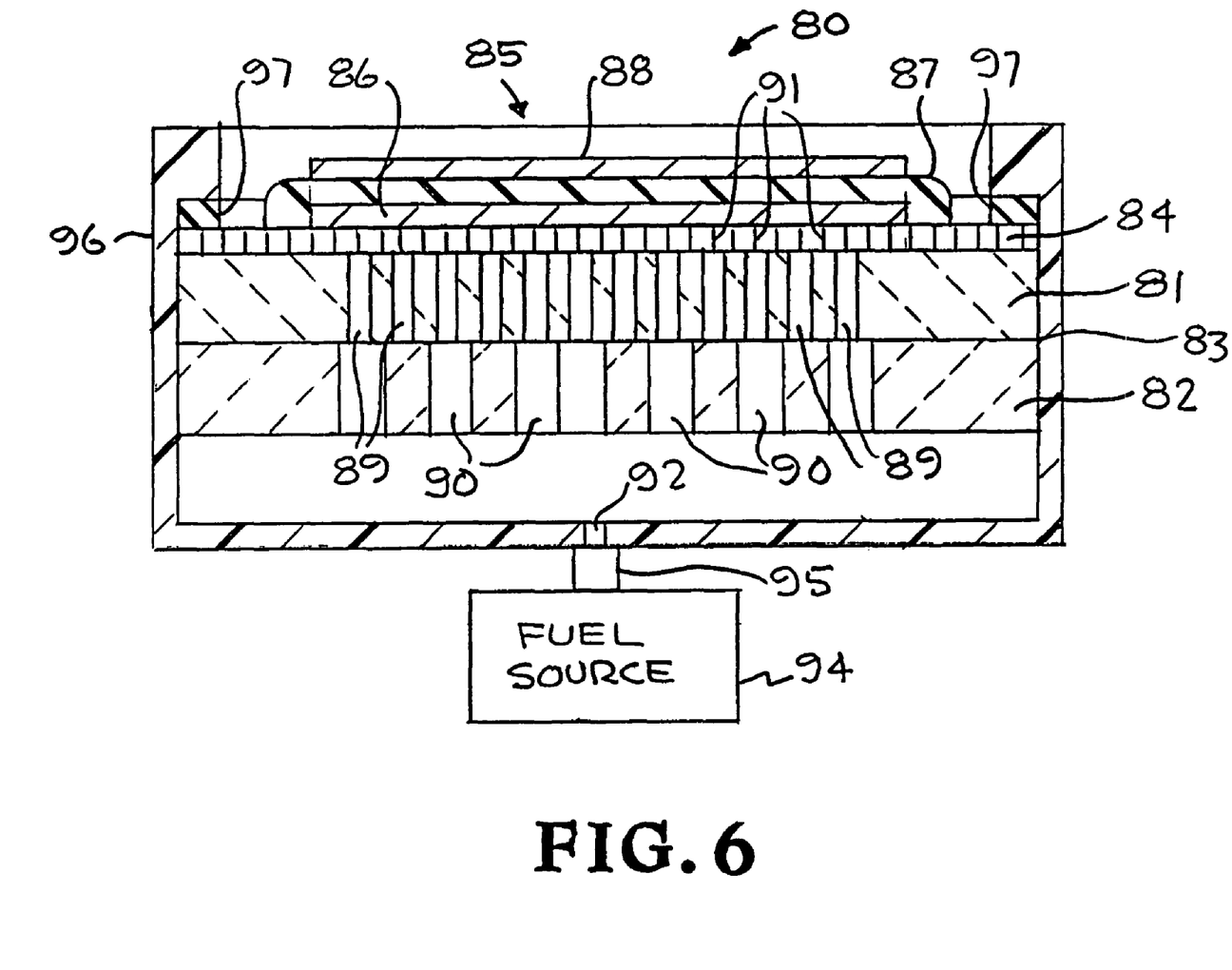
FIG. 6 is a cross-sectional view of another embodiment of the fuel cell using a multiple channel fuel manifold arrangement.

FIGS. 5 and 6 illustrate embodiments of a non-stacked MEMS-based miniature fuel cells, described as being either a solid oxide fuel cell (SOFC), a solid polymer fuel cell (SPFC) or a proton exchange membrane fuel cell (PEMFC), and where air is the oxidant thereby eliminating the oxygen channel and upper substrate 16 of the FIG. 1 embodiment unless stacking of cells is utilized, in which case the embodiment of FIG. 1 including the upper substrate 16 have pores or channel inlets formed to allow the flow of air to the top electrode would be required. The MEMS-based miniature fuel cell of FIG. 5 utilizes electrode/catalyst/electrolyte materials which enable the combination of a fuel and oxidant at elevated temperatures to produce continuous electric current. As pointed out above, the basis of each fuel cell is an anode and cathode separated by an electrolyte layer which can comprise either a solid oxide or a solid polymer material, or proton exchange membrane electrolyte material. Additional layers of catalyst materials can also separate the electrode (cathode or anode) from the electrolyte. In these embodiments micromachined manifolds can be utilized to transport the fuel and oxidant, to each cell and provide a path for exhaust gases. The electrical current generated from each cell is drawn away with an interconnect and support structure integrated with the gas manifold.

The MEMS-based fuel cell of FIG. 5 has three main features. The first two are the substrate host structure on which the fuel cell stack (electrode/electrolyte/electrode) is formed, and in which the manifold structures are formed to deliver the fuel and oxidant to the stack. The substrate can comprise silicon, glass, ceramic, plastic, or any material having similar qualities. By utilizing micromachining techniques, the substrate host structure and manifolding for the fuel cell can be made lightweight. Furthermore, the manifold structures can be manufactured in a variety of methods using MEMS techniques, including micromachining, injection molding, laser drilling, hot embossing, or diamond machining. As illustrated in FIG. 5, the substrate host structure has two parts, one being a substrate host structure 61 with a plurality of channels or pores through it 73 which transport the gas fuel to the fuel cell stack 65. As described previously, the substrate host structure 61 can be a micromachined substrate formed using the aforementioned techniques, or it can be a porous substrate with pores suitable to allow gas to pass through. The substrate host structure can have the fuel cell stack materials deposited on its top side. The second part is a manifold substrate 62 with channels formed in it to transport fuel from one common reservoir, distributing the fuel over the entire area of the channels or pores 73 which deliver fuel to the stack layers. These two parts can be fabricated separately using the techniques cited above, then bonded or mechanically sealed together to form the structure of FIG. 5. A variety of bonding techniques, as used in the art are available, including use of adhesive films or eutectics, or mechanical sealing and packaging techniques so long as they are robust enough through the temperature range of operation.

Figure 3:
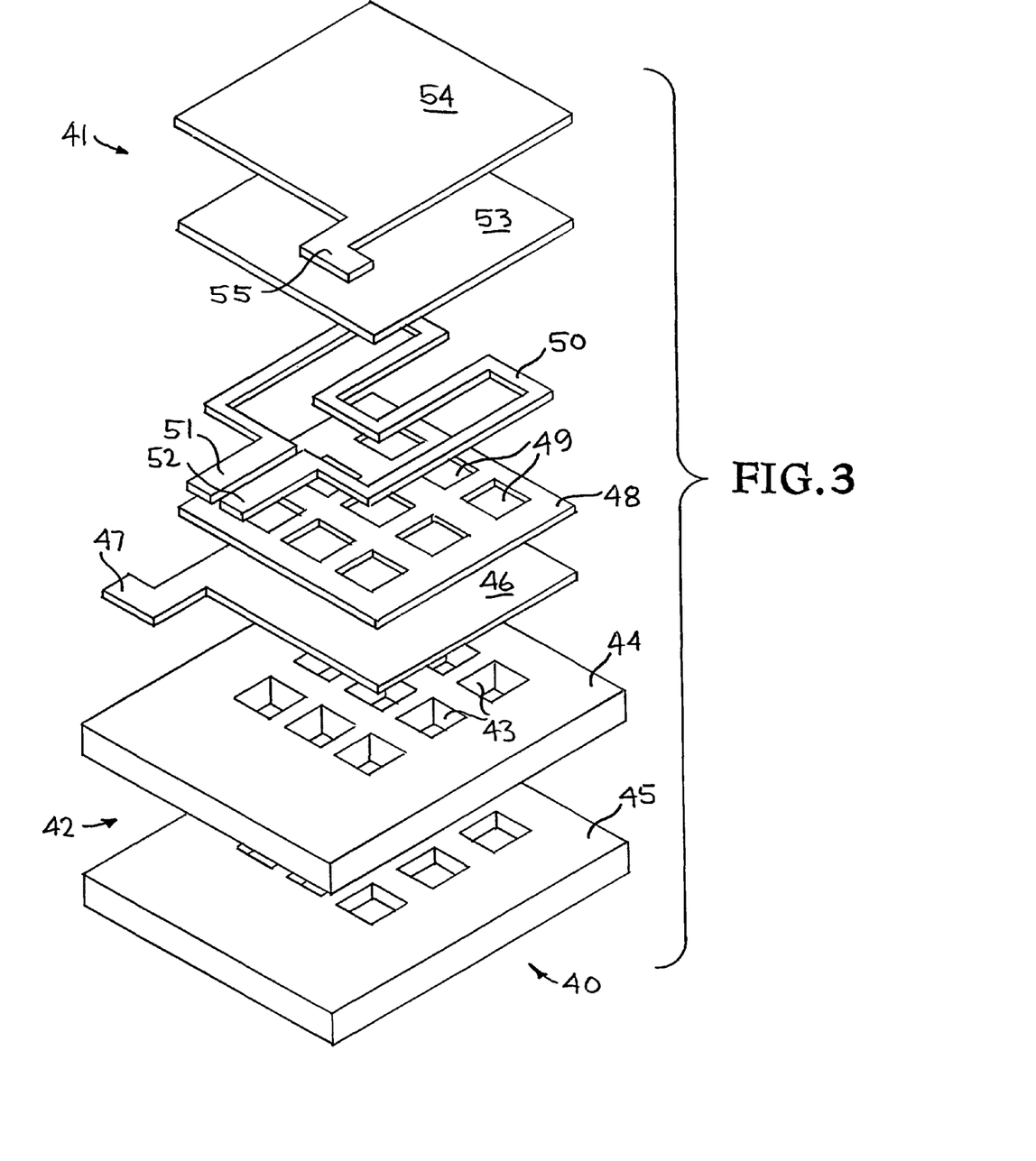
FIG. 3 is an exploded view of another embodiment of the miniature thin-film fuel cell of the invention.

Referring now to FIG. 5, the fuel cell stack generally indicated at 60 comprises a micromachined host structure or substrate 61, a micromachined substrate 62 bonded to substrate 61 at 63, a porous thick-film 64 located on the top surface of substrate 61, and an electrode/electrolyte/electrode assembly or fuel cell stack 65 deposited on the porous thick film or member 64. The substrate 61 has a single or plurality of openings, pores or windows defined by tapered or straight surfaces 66 and 67 which approximately align with tapered or straight surfaces 68 and 69 of a cutaway section 70 in substrate 62 which is connected by a cutaway 71 to a fuel inlet 72, with the single or plurality of openings, pores or windows formed by tapered or straight surfaces 66 and 67 and cutaway section 70 forming a micromachined manifold or pore 73. The electrode/electrolyte/electrode assembly or fuel cell stack 65 comprises a thin-film electrode 74, a thin or thick film electrolyte/catalyst 75, and a thin-film electrode 76. The porous film 64 includes numerous pores 77. While not shown the fuel cell stack 65 would include a resistive heater as in FIG. 3 integrated within the porous thick film 64 or fuel cell stack 65.

By way of example, the substrates 61 and 62 comprise silicon; the porous thick-film 64 comprises alumina, plastic or porous silicon with a thickness of 10 microns to 200 microns and with pores 77 having a diameter of 200 Å to 5 microns and the film 64 having mechanical strength to support the fuel cell stack 65; the electrode 74 comprising 18 nickel, carbon, palladium, or platinum with a thickness of 1000 Å to 2 microns; and the electrolyte/catalyst 75 comprising Ni/YSZ, Pt/Nafion, or Pt/C/Nafion with a thickness of 1 micron to 50 microns and the electrode 76 comprising oxygen catalyzing conducting material, such as Ag, Pt, lanthanium strontium maganate (LSM), or carbon with a thickness of 1000 Å to 2 microns. The micromachined pore or manifold 73 may have a cross-sectional area of 10 µm by 10 µm to 10 mm by 10 mm, with the fuel inlet 72 having a diameter of 25 µm to 1 mm.

The host substrate or structure on which the fuel cell stack is formed has many channels or pores which will enable the fuel, whether it be in gas or liquid form, to transport to the electrode structure. This host structure can be created by selective etching of channels in a silicon substrate, for example, which would result in a free standing fuel cell membrane. This host structure could also be created by etching or molding of the channel features in a variety of other materials as described previously, and can be ceramic, glass, or plastic. This host structure could also be made from a thick film porous material which is bonded on top of the manifold substrate or the channel host structure, as illustrated in FIG. 6. The requirements of the thick film porous structure are that it have enough mechanical strength that it will support the fuel cell stack that can be created on it when positioned over manifold channels or pores of suitable size (0.1-10 mm diameter). Additionally, the pore size must be large enough to provide flow of fuel from the bottom manifolds to the fuel cell stack, but the pores must be small enough that the thin-films which are deposited on top to form the electrode will not deposit down into the pores too deep, so as to completely seal the pores. This issue is less important if a fuel cell membrane electrode assembly in laminate form were bonded, attached or mechanically sealed over the host structure rather than deposited directly onto it. Several materials exist in sheet form which already have the desired porosity characteristics. These include glass plastics, ceramics, or anodized alumina. In the case of the anodized alumina, sheets can be formed which are approximately 50 µm thick which have pore sizes on the order of 0.2 µm, with a small fraction of the structure having pores which are only 0.2 µm diameter. This would allow thin-film deposition on the top side without depositing down into and sealing into the pores, and can be accomplished using a variety of deposition techniques, including sol-gel, or spin cast approaches. Similar structures can be achieved using two porous ceramic materials, or two porous plastic thick films, each having different pore sizes. Again, these materials are readily available from commercial suppliers, or fabricated using techniques reported in the open literature.

As shown in FIG. 6, the fuel cell assembly or device, generally indicated at 80 basically comprises a substrate/host structure 81, a manifold substrate 82 bonded to substrate 81 at 83, a porous thick-film layer 84 located on or within substrate 81, and a thin-film fuel cell stack generally indicated at 85 located on layer 84. The fuel cell stack 85 includes an electrode 86, an electrolyte 87, an electrode 88, and a heater element, not shown, but which may be constructed as in the FIG. 3 embodiment, which shows a heater 50 between electrodes 46 and 54. Continued reference is made to FIG. 6. Alternatively, the heater element may be formed on top of the substrate/host structure 81 or within the porous thick film layer 84, so long as it is electrically isolated from the electrodes 86 or 88. The substrate/host structure 81 includes a number of vertical channels or pores 89 which are in open communication with manifold channels 90 in substrate 82. The porous thick-film layer 84 includes numerous pores 91 which are in open communication with channels 89 of substrate 81. If the porous thick film layer 84 is mechanically strong enough and allows sufficient flow of fuel through to the fuel cell stack 80, it can be directly bonded or mechanically sealed to the manifold substrate 82 with pores 91 in open communication with manifold channels 90. The substrate 82 includes an opening or passageway forming a fuel inlet not shown in the FIG. 6, but similar to the fuel inlet 72 of FIG. 5, in open communication with the plurality of manifold channels 90, which is adapted to be connected to a fuel source 94 via connector 95. Note that the substrate/host structure 81 is etched such that the porous thick film 84 aligns with the pores 89 of the host structure 81 enabling fuel to flow to the fuel cell stack 80 and preventing fuel from flow elsewhere. Additionally shown in FIG. 6 is a package 96 and seals 97 which enable the manifold substrate 82, host structure/substrate 81 and porous thick film layer 84 supporting fuel cell stack 80 to be assembled and mechanically sealed. If the substrate 82 is positioned such that the pores 90 are in open communication with the bottom portion of the package 96, the package 96 may include an opening or passageway forming a fuel inlet 92 which is adapted to be connected to a fuel source 94 via connector 95.

The third main feature of the MEMS-based miniature fuel cell is the thin film fuel cell stack itself. The series of thin film materials, as illustrated in FIG. 5, for example, are an electrode, a catalyst, an electrolyte, a catalyst, and an electrode. Depending on the particular electrolyte the catalyst layers may not be necessary. The thin film fuel cell stack can be formed by a variety of thin-film deposition techniques including sputter or evaporative techniques, sol-gel, spin cast, dip coating approaches. The individual layer thicknesses may vary from 0.5-50 µm. The stack structure may also be formed using a sheet of the electrolyte material which is then sandwiched between the electrode/catalyst layers forming a membrane electrode assembly component or laminate and attached, bonded or mechanically sealed on a MEMS manifold host structures. The requirements of the electrodes are that they have low resistance, continuous conductivity, and are porous enough for the fuel and oxidant to diffuse through to the catalyst/electrolyte interface where the electrochemical reaction occurs, and allow the byproduct of the reaction to diffuse out of the electrode structure. Electrode materials can be made porous through the techniques, including rf-sputtering, electron beam deposition, or sol-gel processes. The electrodes can also be made porous using photolithographic techniques to etch pores into the metal film. Additionally, the porous electrodes could be created using a porous metallic sheet which could also be used as the porous manifold host structure. The catalyst and electrolyte layers are dense continuous films deposited by the techniques described previously. The electrolyte can be either solid oxide, solid polymer, or proton exchange type materials.

Figure 7:
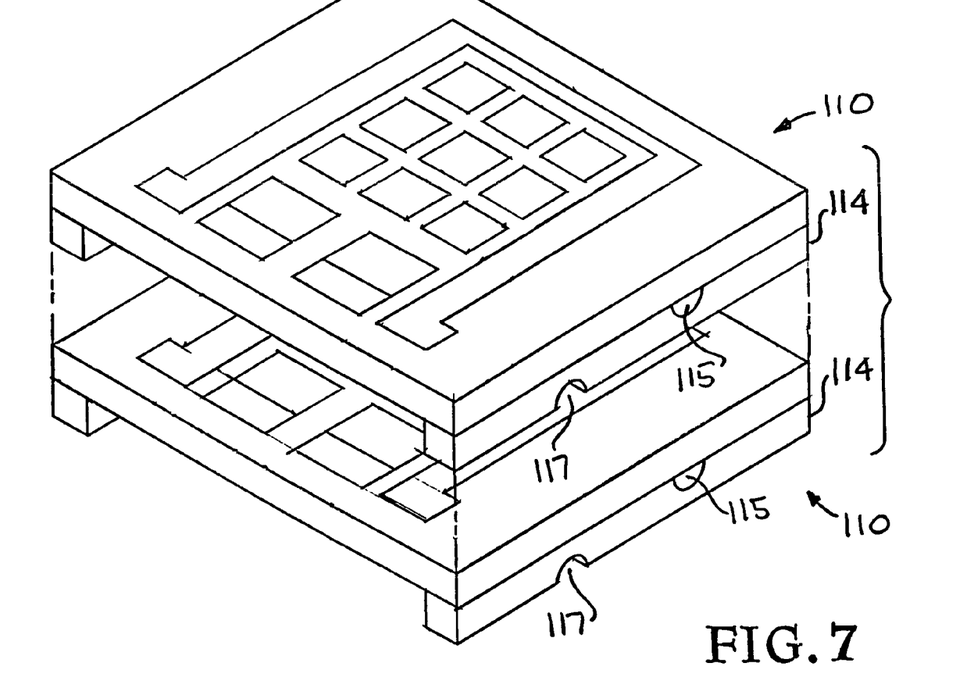
FIG. 7 is a view which illustrates the approach for stacking the MEMS-based fuel cell modules for power and voltage scaling.

FIG. 7 illustrates an embodiment wherein individual cells can be directly stacked on one another. In FIG. 1, the fuel inlet 15 and the oxidant inlet 17 enter from the sides of the fuel cell module 10, or in a manner in which the inlets 15 and 17 remain in open communication with respective flow channels 29 and 30, the individual cells 10 can be directly stacked on one another, as shown in FIG. 7, with the cells indicated a 110, the fuel inlets indicated at 115, and the oxidant inlets indicated at 117. Further, if the location of the fuel and oxidant inlet channels of the cells are offset, as shown in FIG. 7, such that they are easily accessible then fuel can be delivered to the plurality of inlets from a common fuel or oxidant reservoir. Additionally, substrates 14 and 16 of FIG. 1 can be the same substrate, as indicated at 114 in FIG. 7, having appropriate inlets 115 and 117 for fuel and oxidant formed in top and bottom areas of the substrate 114 which have open communication to the appropriate flow channels in order to deliver the fuel to the required electrodes 25 and oxidant to the electrode 27, as seen in FIG. 1. In the case of the oxidant inlet 117, the oxidant or air flow is enabled by forming a channel or pore using micromachining techniques as previously described, or using a material having adequate porosity and mechanical strength which enable ambient flow of air to the electrode. In this stacking embodiment, the electrodes for each module are connected in series so as to add the voltage produced by each individual module. This stacking approach is relevant to all embodiments as described in FIGS. 2, 3, 5 and 6.

Figure 8:
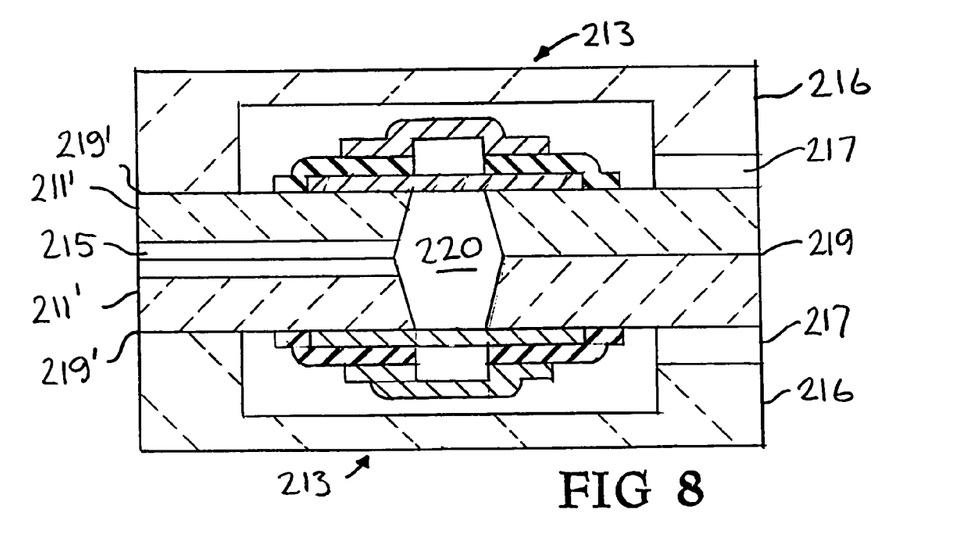
FIG. 8 is a cross-sectional view of another embodiment of the fuel cell enabling the cells to be inverted and bonded in order to deliver fuel to two cells from one common inlet.

An additional embodiment for stacking of MEMS-based fuel cells is illustrated in FIG. 8. In this embodiment, the substrate/host structure 211' having fuel cell electrode/electrolyte stack 213 and single or plurality of openings, channels or pores 220 is now bonded or mechanically sealed as indicated at 219 to a similar substrate/host structure 211 which is positioned upside down as illustrated in FIG. 8 such that a symmetrical structure is formed and a single fuel inlet 215 can now deliver fuel to double the effective fuel cell stack area. The fuel inlet 215 is formed using a cutaway section in communication with the flow channel openings, channels or pores 220. The flow channels and cutaway sections are formed using one or more of the various micromachining techniques as previously described. If additional stacking or packaging is required, another substrate structure 216, similar to the substrate 16 of FIG. 1, is positioned over each fuel cell electrode/electrolyte stack 213 and bonded or mechanically sealed as indicated at 219' to the substrate/host structure 211 and 211' similar to that shown in FIG. 1. This embodiment, as illustrated in FIG. 8, enables each of the fuel cell stacks to have a cavity and oxygen inlet structure 217 formed in said substrate 216 as shown using micromachining techniques. This additionally enables direct stacking of fuel cell modules as previously described and illustrated in FIG. 7.

Finally, an integrated resistive heating element can be utilized to efficiently heat the fuel cell stack without heating the entire host structure and package. The resistive heating element is attached to a rechargeable microbattery located within the package, and is used to turn-on the fuel cell by uniformly heating the fuel cell stack. Once the fuel cell is powered on, the resistive heater draws its power from the operating fuel cell. The resistive heater can be located within the fuel cell stack but will require electrical isolation. The heating element can also be located within the porous host structure and be designed such that the heat is conducted to the fuel cell stack structure, and insulated from the manifold substrate and exterior packaging.

Miniature MEMS-based thin-film fuel cells have been described that will yield an order of magnitude greater power density than any fuel cell currently available. Further, the MEMS-based fuel cells just described are small and compact and thus offer improved performance over rechargeable batteries as a miniature power source. Since the fuel cell electrolyte layer can be made thinner, e.g. 1-2 μm thick as compared to 1 mil, then the operating temperature can be reduced by hundreds of degrees from the conventional operation temperatures of >600° C. for the case of solid oxide electrolytes. The electrolyte material may be YSZ, a solid oxide or a solid polymer, or a proton exchange membrane. Also, the MEMS-based fuel cells have microflow channels and manifolding micromachined into the host structure/substrate, utilize an integrated thin-film resistive heater for efficient heating of the fuel cell stack, and contain a rechargeable microbattery connected to the heater for startup control.

Embodiments of the Present Invention

Described herein are means to incorporate catalytic materials into the fuel flow field structures to enable catalytic reforming of a hydrocarbon based fuel, such as methane, methanol, or butane. The method expands from the basic concept of a MEMS-based fuel cell described above. Additionally, an integrated pre-reforming component to a fuel cell, as described herein, offers advantages for compact, light-weight portable power sources for battery replacements.

The basis of each fuel cell is an anode and cathode separated by an electrolyte layer formed in a silicon substrate support structure. The electrolyte layer can comprise either a solid oxide or solid polymer material. Additional catalyst layers can also separate the electrode (cathode or anode) from the electrolyte. Gas manifolds transport the fuel and oxidant to each cell and provide a path for exhaust gases. The electrical current generated from each cell is drawn away with an interconnect and support structure integrated with the gas manifold. Micromachining of silicon or other materials is utilized to simultaneously form the manifold structure within the host structure while incorporating electrical connectors and resistive heaters within the fuel cell stack formed on the host structure.

While hydrogen is traditionally the ideal fuel for generation of current by fuel cells, hydrogen remains difficult to store in high concentrations, and costly to produce in large quantities. Butane can be directly utilized as fuel by forming a copper-samaria-ceria catalyst This fuel can be operated for long periods of time without the buildup of tar or carbon, which may foul the anode reaction altogether. Abundant, cheap, and easy to store hydrocarbon fuels can be used rather than hydrogen. Described below is one embodiment for incorporating catalytic materials within the anode of a MEMS based or miniature fuel cell, along with an integrated porous pre-reformer structure to create a direct hydrocarbon fueled solid oxide fuel cell. Additionally, the fuel cell system can be operated in a regenerative mode wherein the waste heat from losses in the fuel cell can be used for the heat of reaction to sustain the catalytic fuel processor reactions. While this embodiment is described mainly for solid oxide fuel cells, it can also be applied to solid polymer, proton exchange membrane, or phosphoric acid fuel cells as long as the catalytic reforming reactions for fuel processing occur at temperatures similar to the fuel cell operating temperature.

Channels can be formed in a cross-flow design in which fuel enters at one end, flows across the fuel cell anode, and exits at the opposite end. The channels can alternatively be formed in a serpentine design in which the fuel enters at one point of the channel and flows in a serpentine fashion back and forth as it crosses the fuel cell anode. This serpentine design, or a plurality thereof, may offer benefits in control of pressure drop and residence time of the fuel at the anode for optimal fuel utilization and power density.

Figure 9:
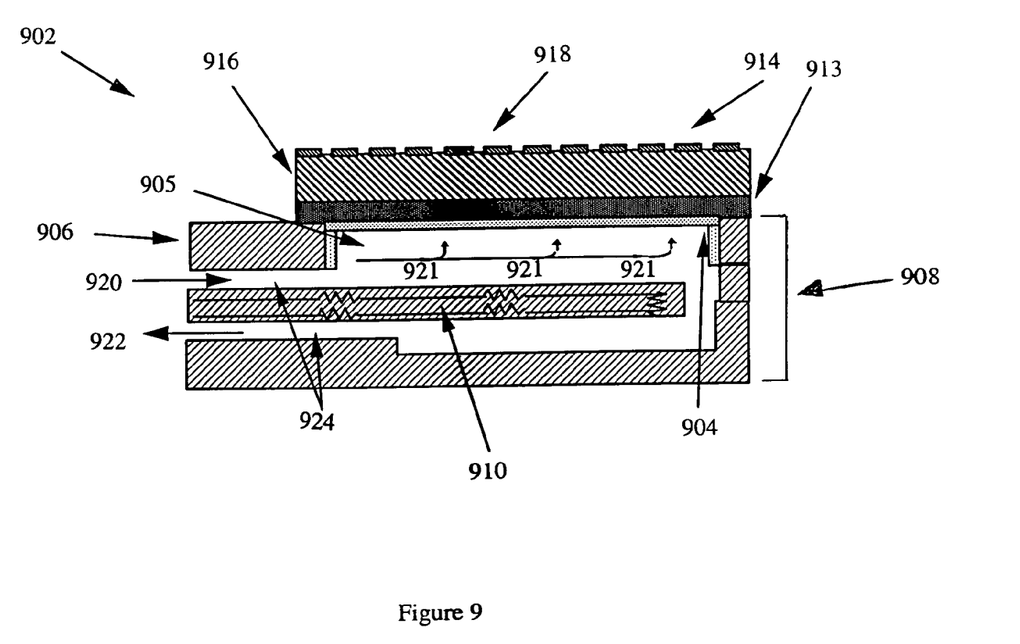
FIG. 9 shows a MEMS-based fuel cell.

Referring to FIG. 9, a MEMS-based fuel cell 902 with catalyst-coated 904 channels 905 is shown. These channels can be etched using micromachining techniques connecting to a free standing membrane at the top surface of the host structure 906, e.g., a silicon wafer, glass or ceramic. Another approach (not shown) comprises forming a series of micropores at the top surface of the manifold support structure 908 that extend down to the larger flow field channel openings. A resistive heater 910 can be formed adjacent to the flow field host structure to provide the necessary heat to the fuel cell to start current generation at rates on the order of >100 mA/cm$^2$. Porous metal electrodes (i.e., air electrode 914 and fuel electrode 913) separated by a continuous electrolyte layer 916 are positioned above manifold support structure 908. Arrow 918 shows the direction of air flow. Arrow 920 shows the direction of fuel flow into the fuel cell, arrows 921 show the direction of fuel vapor flow towards fuel electrode 913, and arrow 922 shows the direction of exhaust flow out of the fuel cell. Fuel vaporizer 924 and counterflow heat exchanger regions 924 can be seen in channels 905.

Figure 10:
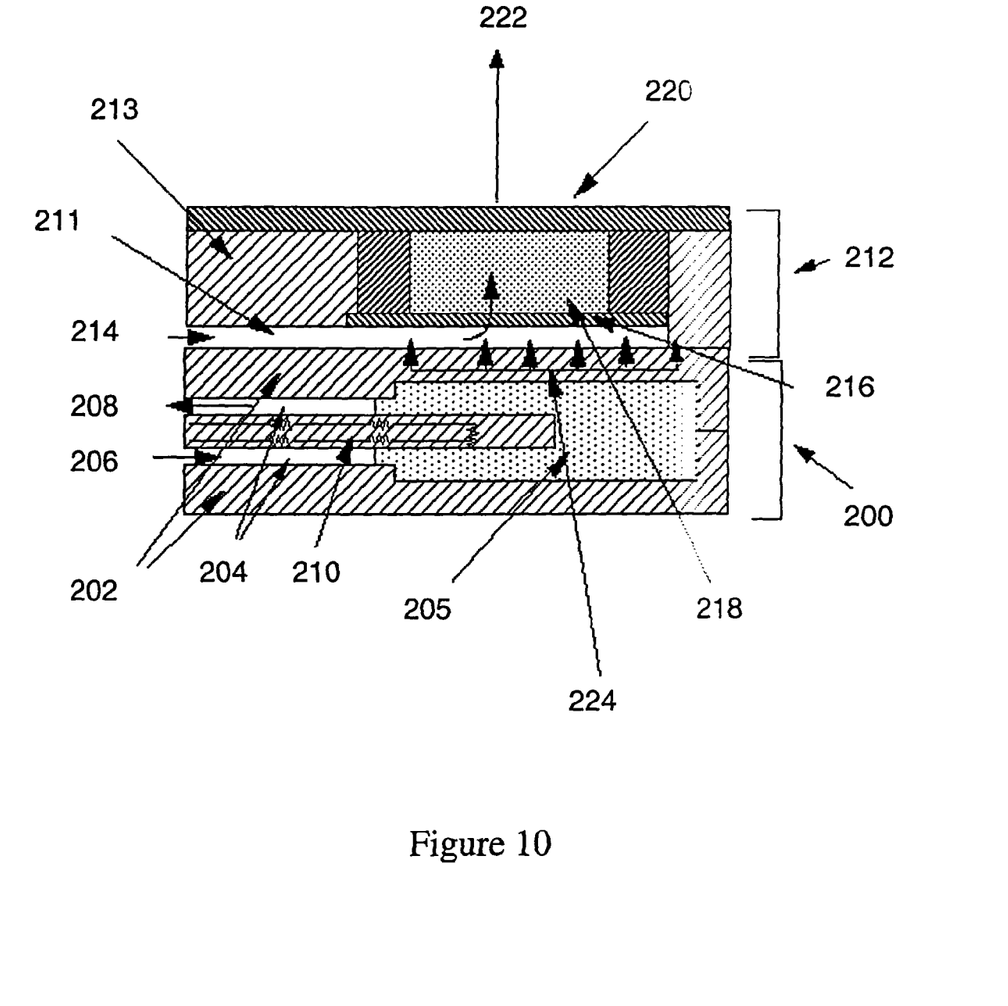
FIG. 10 shows a catalytic microcombuster.

Fuel cell heating for startup and continuous operation can also be provided by the use of a catalytic microcombuster and fuel processor. Referring to FIG. 10, the catalytic microcombuster 200 comprises a substrate 202 having micromachined flow channels 204 that are either filled with or coated with a catalyst material 205, e.g., platinum or platinum on an alumina support. When fuel and oxidant are combined in the microchannels (direction of fuel/air flow shown by arrow 206), exothermic reactions occur which generate heat in a controlled fashion. The direction of exhaust flow is shown by arrow 208. The fuel can either be hydrogen or a hydrocarbon. Fuel flows through a fuel vaporizer region 211 and the fuel vapor travels through porous membrane 216. An electrical heater 210 is integrated with the microcombuster to provide initial heating, after which the exothermic reactions produce sufficient thermal energy to sustain the reactions. Further heat control can be obtained by control of the air and hydrogen flow rates and ratios for a given microcombustor design (volume and surface area). A fuel processor 212 is integrated with microcombustor 200 and comprises a porous membrane support structure 213 having a fuel flow channel 214, an optional porous membrane 216, a porous catalyst or catalyst coating 218 that processes the fuel, and porous catalytic membrane 220 where the processed fuel exits to the fuel cell manifold (not shown) of an integrated MEMS-based fuel cell as shown by arrow 222. Heat generated from microcombustor 200 migrates in the direction shown by arrow 224 to heat fuel processor 212.

As shown in FIGS. 9 and 10, the heat and catalytic fuel processing components can be highly integrated and formed within the same microflow channels and host structures as the MEMS-based thin film fuel cell. A thin film fuel cell is formed on top of this microflow channel host structure and heater by:
depositing a porous anode layer,
depositing an anode catalyst layer,
depositing an electrolyte layer,
depositing a cathode catalyst layer, and
depositing porous cathode layer.

The layers of a solid oxide fuel cell can, for example, comprise (1) nickel, (2) ceria, (3) yttri-stablized zirconia, (4) ceria, and (5) lanthanum strontium manganate. The layers of a proton exchange membrane fuel cell can, for example, comprise (1) nickel, (2) carbon-platinum-ruthenium, (3) a perfluorosulfonic acid/polytetrafluoroethylene (PFSA / PTFE) co-polymer (e.g., Nafion®), (4) platinum, and (5) carbon. These layers can be formed by a variety of deposition techniques, including sputter or evaporative vacuum deposition, solgel deposition, electro-deposition, colloidal spray deposition, screen printing, or other techniques known in the art. Additionally, thick film layers can be attached and bonded to any of the layers described above. Typical layer thickness will be in the range of 1-25 μm as deposited, and 10-100 μm for thick film layers. The order of the layers being formed as described in steps 1-5 above can be varied if access for coating or application from both sides of the host structure substrate is available. For example, the electrolyte layer may be first deposited, from the top side, followed by the cathode catalyst and cathode electrode layers deposited from the top side. The anode catalyst and anode electrode layers may then be deposited from the bottom side.

A steam reforming device converts a hydrocarbon fuel to hydrogen and byproducts prior to diffusing to an anode layer. The device provides flexibility in operation and balancing fuel cell operation. While the above description embodies a fuel cell in which the manifold microflow channels distributing vaporized fuel over the surface area of the fuel cell anode, difficulty in matching the reaction rates of the fuel processing and conversion to the electrocatalytic reactions at the fuel cell anode and cathode may limit the efficiency of such an embodiment. Another embodiment describing an integrated fuel processor component is provided.

Figure 11:
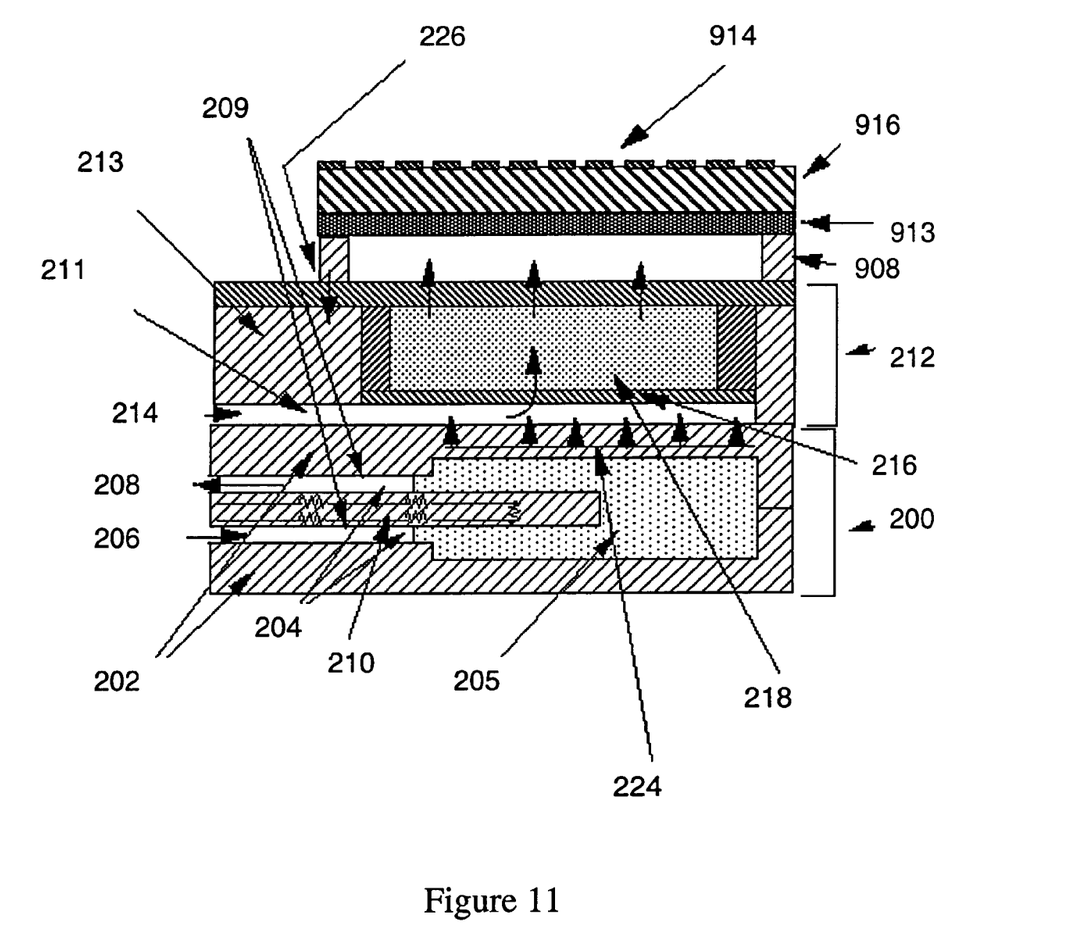
FIG. 11 shows a catalytic microcombuster integrated with a MEMS-based fuel cell.

A fuel mixture in gas or liquid form flows into a microfluidic interconnect from some reservoir supply having a means for controlling the flow rate with, for example a micropump. As illustrated in FIG. 11, the fuel mixture flows into the microfluidic channel(s) 214, then flows through a vaporizer region 209 which is heated with a counter-flow heat exchanger (recouping heat from hot exhaust streams from a catalytic microcombustor, for example) and an auxiliary heat source 210 (e.g., a resistive or catalytic microcombustor heater) if necessary, converting the fuel and water mixture to vapor, which then flow through microchannels into catalyst coated fuel processor 212 as depicted by 214 in FIG. 11.

The fuel may be gas, such as methane, or liquid, such as methanol or butane. The fuel can be premixed with an appropriate amount of water to optimize the steam reforming reactions, for example 50 mole percent water for methanol, and 88 mole percent water for butane. The fuel can also be mixed with the water at the appropriate ratio after the individual fuel and water streams have been heated to a vapor. Additionally, the fuel can be directly decomposed through cracking processes, but this approach can results in undesirable carbonaceous deposits.

The heat source may be a catalytic microcombustor which as previously described is formed in microchannels adjacent to and in thermal contact with the fuel inlet and steam reforming microchannels. The microfluidic flow passages can be formed in a glass, ceramic, metal, or silicon substrate using micromachining techniques, to have diameters in the 100 µm to 5 mm diameter range. The substrate thickness in which the microchannels are formed is typically on the order of 500-1000 µm thick. Therefore aspect ratios for the microchannels of >10:1 height to diameter are possible allowing fuel mixture flow rates ranging from 0.5 µliters/min to 500 µliters/min.

As previously described and shown FIG. 11, the integrated catalytic fuel processor 212 comprises a substrate support structure 213 made from glass, silicon, ceramic, or metal. Vertical channels 204 are formed into or through this substrate by etching, molding, or machining. The direction of fuel flow is shown by arrows 214. The diameter of the vertical channel ranges from 100 µm to 2 mm and height to diameter aspect ratios >10:1 are possible. The large vertical channels can then be filled with a catalyst material, such as PtRu, CuO, Cu—ZnO, Alumina, Ni or other materials suitable for catalytic steam reforming of hydrocarbon fuels. The materials are deposited into the channels using techniques such as solgel deposition, washcoat deposition, evaporation, sputtering, or simply flowing in particles or spheres coated with the catalyst material. The catalyst materials provide a high surface area volume over which the fuel flows. The catalytic fuel processor and microcombuster further comprises a heater 210 for startup and sustained operation, an inlet 216 for the fuel, preferably from the bottom of the microchannel host structure, a microchannel or plurality of microchannels 218 filled or coated with a catalyst material (as previously described), and an outlet 222 in microfluidic communication with the fuel cell anode flow field. The microchannel host structure 213 for the integrated catalytic fuel processor is in thermal communication with both the fuel cell flow field host structure, i.e., the manifold support 908, and the heater 200, and this heater may provide both startup and continuous heating for the fuel cell and catalytic fuel processor. Arrow 226 shows the direction that waste heat from the fuel cell will flow to heat the catalyst in the fuel processor.

The integrated catalytic fuel processor can have several configurations, including the one illustrated in FIGS. 9 and 11. Alternative configurations allow for the fuel to flow through the inlet of the microchannel(s), then flow horizontally through the microchannel for some distance before flowing through the outlet to the anode manifold of the fuel cell. The distance the fuel must flow through the microchannel(s) depends on the necessary space velocity of the catalyst and microchannel design such that the fuel is efficiently converted to hydrogen and other byproducts. For example, the fuel may flow down microflow channels having many tens of millimeters length before passing through the outlet.

The outlet of the flow channel can have a porous thin screen or micropore layer which has a plurality of smaller pores (i.e., micropores), with diameters ranging from 0.1 µm to 10 µm. The micropores can either be random or oriented vertically. The array of micropores is intended to allow the fuel and gases to flow through the integrated catalytic fuel processor with only a small pressure drop from inlet to outlet of the entire support structure and micropore layer. The micropores can also hold catalyst materials within the fuel processor microchannel if catalyst particles are used as the fuel gases pass through. If a catalyst coating is used, the micropores provide a high surface area catalyst support for optimal fuel conversion efficiency. The micropore layer can be formed by such techniques as etching in a layer of silicon, glass, metal or ceramic, bonding or compressing a thick film porous structure of ceramic, glass, silicon or metal over the microchannel host substrate with the large microchannels, or other means of creating a porous screen layer. The thickness of this layer is on the order of 25 µm to 1 mm. A resistive heater or other means for heating can be positioned on the micropore layer or in thermal communication with the support structure for the micropore layer, in order to heat the catalyst to the required temperature to react the hydrocarbon fuel flowing through the catalyst coated microflow channels, converting the hydrocarbon fuel to hydrogen and byproducts such as carbon dioxide.

The bottom of the microchannel can also optionally have a porous micropore screen if necessary to hold the catalyst material in the vertical channel. The fuel-water vapor flowing from the vaporizer through a microchannel made in silicon, glass, ceramic, or metal, then flows through the catalytic fuel processor or microreactor channel, or is distributed through a plurality of catalytic microreactor channels, such that the total surface area of the catalyst is adequate to completely convert the fuel to hydrogen and other byproducts through steam reforming or oxygen reduction reactions. A heater can be placed on or in thermal communication with the microreactor substrate to provide necessary heat for startup and sustaining the steam reforming reactions. As described above the heater can be a resistive heater, or a catalytic microcombustor heater with a resistive heater for initial startup.

Three embodiments for the microchannel host structure portion of the integrated catalytic fuel processor are described herein. The first embodiment incorporates a single microchannel or an array of microchannels filled or coated with catalyst materials. In this embodiment, the fuel passes through the microchannel(s) vertically. The second embodiment embodiment incorporates a densely packed array of horizontal microchannels filled or coated with catalyst materials. The fuel enters the inlet, preferably from the bottom of the microchannels, then flows horizontally along the microchannels for some distance wherein the fuel efficiently reacts with the catalyst. The processed fuel flows to an outlet, nominally flowing vertically into the microchannel anode flow field of the fuel cell. The third embodiment incorporates a single horizontal micochannel or a densely packed array of horizontal microchannels in a serpentine pattern filled or coated with catalyst materials. The fuel enters the inlet, preferably from the bottom of the microchannels, then flows horizontally along the microchannels for some distance wherein the fuel efficiently reacts with the catalyst. The processed fuel flows to the outlet, nominally flowing vertically into the microchannel anode flow field of the fuel cell. In each embodiment, the surface to volume ratio of the microchannel host structure is optimized for the most efficient operation at the desired temperature and flow.

The fuel cell can be a solid oxide fuel cell, and can be heated by the same heater as for the catalytic microreactor. Once the catalytic fuel processor and fuel cell have been heated to the operating temperatures, (250°-400° C. for the catalytic steam reformer, and 350°-600° C. for the SOFC), heat generated from losses in the SOFC may be coupled to the catalytic reformer to sustain operation of both devices with little or no additional heat input by the integrated resistive heaters. The integrated SOFC, fuel reformer additionally includes manifold and packaging for air flow over the cathode of the fuel cell. Furthermore, the fuel cell can be any electrolyte type as long as the temperature of operation is similar to the reaction temperature of the catalytic fuel processor.

Solid Oxide Fuel Cell

Solid oxide fuel cells are generally designed to use hydrogen or carbon monoxide as a fuel. However, neither hydrogen nor carbon monoxide is easily liquefied, and liquid hydrogen is particularly dangerous to store. As a result, the use of more complex fuels, such as methanol or butane, may be desirable. These complex fuels may need to be reformed to simpler compounds such as hydrogen and carbon monoxide before they can be used by the solid oxide fuel cell. Typical reforming reactions include steam reforming, where the fuel is mixed with water; partial oxidation reforming, where the fuel is mixed with oxygen (typically from air); and thermal cracking, where the fuel is not mixed with anything, but decomposes at a given temperature. All of the reforming reactions may be accelerated by the addition of a solid catalyst. Conventional solid oxide fuel cell systems that use complex fuels generally include a separate reformer, as well as fuel cell modules that are constructed as separate modules. These components are typically separated by meters of tubing.

Embodiments of the present invention provide fluid communication between a solid oxide fuel cell stack and the reformer using a manifold with very short distances between the two components. In order to fabricate these compact structures, various patterning techniques used in microelectro-mechanical system (MEMS) and integrated circuit ("IC") fabrication are applicable, including photolithography and stamping. Specifically, the use of silicon as a manifold material is advantageous because of the familiarity of the MEMS and IC industries with that material.

Fabrication of these compact structures is frequently assisted by using fuel cell stack layers which are thinner than conventional solid oxide fuel cells. Decreasing the electrolyte thickness improves performance by reducing the resistance of the fuel cell. Thin film electrolytes may be produced by the standard IC processing technique of sputtering. In particular, thicknesses less than 10 micrometers improve the performance of the fuel cell. In addition to the electrolytes, the electrodes can also be fabricated with IC processing techniques or conventional ceramic processing techniques.

The short distance between the fuel cell stack and the reformer results in a more compact system, thus allowing the system to be used in portable applications where it is desirable to keep the size and weight of the system at a minimum. The short distance also enables the catalyst and the fuel cell stack to be in close thermal communication. The close thermal communication allows excess heat produced in the fuel cell stack to be used to heat the fuel reformer (catalytic microreactor), or excess heat in the fuel reformer to be used to heat the solid oxide fuel cell stack. In addition, heat generated from the catalytic microcombustor now is in thermal communication with the entire integrated system, both the catalyst in the fuel processor region, and the fuel cell, thereby providing a closed loop control mechanism to maintain the temperature of the fuel cell and fuel processor. This sharing of thermal energy results in a more efficient system. In addition, the manifold that routes the fuel to the electrode can be at the same temperature as the fuel cell. The manifold can serve as the means for providing the close thermal communication of the catalyst in the fuel processor and the solid oxide fuel cell.

It is recognized that these components cannot readily be made to operate at exactly the same temperature due to finite thermal conductivities. However, operation of all components within approximately 200° C. of each other is sufficient to achieve the described advantages.

In one embodiment, the catalyst is directly in contact with the fuel electrode (anode) of the fuel cell stack. One effective technique for fabricating the combined fuel cell stack and the microreactor (reformer) is to use silicon micromachining techniques. To maximize the flow passage between the fuel cell stack and the microreactor small flow passages can be used. Diameters less than 5 millimeters, allow room for complex flow patterns. In certain embodiments, the maximum flow passage character is less than 3 millimeters or less than 1 millimeter.

In one embodiment, the fuel electrode is covered with a porous fuel reforming catalyst. Locating the catalyst in this manner allows for close thermal communication between the fuel cell and the catalyst, thus improving the transport of fuel and products. For example, locating the catalyst within 1 mm of the fuel electrode can eliminate losses associated with mass transport.

When the electrode is covered with the catalyst the incoming fuel and the outgoing products are both present in the catalyst. The outgoing products contain additional oxygen atoms which are consumed in the fuel cell reaction, and these products can be used in the fuel reforming reaction to break down the incoming fuel. For example, if the fuel includes butane, water and carbon dioxide are formed as products at the fuel electrode. The water and carbon dioxide move through the catalyst as they exit the fuel electrode. Incoming butane can react with this outgoing water and carbon dioxide to produce hydrogen and carbon monoxide. In this way, the incoming fuel stream does not need to include as much water or other forms of oxygen in order to drive the fuel reforming reaction. In some embodiments, the configuration of the catalyst can force the fuel and products to move in opposite directions, thus increasing the time available for reactions to occur.

If the catalyst is sufficiently thick and highly reactive, the incoming fuel does not need to include any additional oxygen (e.g., water or oxygen gas), and the complete fuel reforming reaction can occur using the products of the solid oxide fuel cell. Some fuel cells are tolerant of partially reformed fuels. If a reformed fuel is used, the catalyst need not complete the fuel reforming reaction.

The system may be constructed in conjunction with a manifold which routes the fuel to the catalyst. One technique for producing this manifold is silicon micromachining. By using photolithography, etching and other tools known in the field of micromachining, small systems may be constructed with significant complexity.

Pores perpendicular to the fuel electrode can be included in the catalyst. This construction provides minimal resistances to fuel transport to the fuel electrode and product transport away from the fuel electrode.

The integrated design can further be optimized by incorporation of microchannel counter flow heat exchangers in various regions for various gas flow paths. For example, the vaporizer region for the fuel inlet may couple the heat from the fuel cell anode exhaust or the microcombustor exhaust or both to preheat and vaporize the incoming liquid fuel. The fuel cell cathode can contain heat exchangers such that the air flowing in is preheated by the air exhausted from the cathode. Air flowing in to the microcombuster to be mixed with the fuel can be preheated by the microcombustor exhaust stream. The heat exchangers are typically a single microchannel or an array of microchannels which are positioned adjacent one another having their respective gas or liquid flows in opposite directions. With appropriate design and thermal communication, the heat is effectively transferred from one flow to the other over an optimal path length.

Finally, the complete integrated system requires thermal isolation to minimize heat conduction, and resulting energy losses to the outside. Examples of effective insulation include an aerogel material, vacuum packaging, or combinations of both. Thus, the integrated system can be operated at high temperatures with the external temperature being very close to that of the surrounding environment.

The catalytic microreactor described herein is integrated directly with a fuel cell. The flow of reformed fuel from the catalytic microreactor goes directly into a manifold of a MEMS based fuel cell. The manifold channels are formed in the host structure through etching, molding, or other techniques. The substrate can be made from glass, silicon, or ceramic, and other details are described in previous patent application describing a MEMS-Based fuel cell (IL-10186). The host structure for the fuel cell is bonded to the substrate in which the microreactor is formed. Additional bonding and sealing materials can be used, such as ceramic or glass preforms, or high temperature silica based bonding materials and adhesives. Other embodiments may incorporate the microchannels for the fuel processor within the same substrate as the fuel cell flow field. In these embodiments, the flow field channels for the fuel cells can be the catalytic fuel processor microchannels which are coated with the catalyst materials as previously described. As the fuel flows into and along the channels reacting with the catalyst, the byproducts diffuse through the micropores to the fuel cell anode. Thus, the integrated fuel processor acts as a pre-reformer for the fuel cell wherein any unreacted fuel will be completely processed within the fuel cell electrode.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

While various materials, parameters, operational sequences, etc. have been described to exemplify and teach the principles of this invention, such are not intended to be limited. Modifications and changes may become apparent to those skilled in the art; and it is intended that the invention be limited only by the scope of the appended claims.

The invention claimed is:

1. An apparatus comprising:
   a fuel cell stack having a pair of electrodes including an anode and a cathode, and a thin film solid oxide electrolyte disposed therebetween;
   a manifold coupled to the fuel cell stack for conveying a fuel to the fuel cell stack;
   a fuel processor, coupled to the manifold and having:
      a substrate support including at least one channel, and
      a catalyst for reforming the fuel; and
   an electric heater positioned in at least one location selected from: between the electrodes, and along a fuel path at a point upstream from the fuel cell stack for heating the fuel prior to the fuel reaching the fuel cell stack.

2. The apparatus of claim 1, wherein a distance between at least one of the anode and the cathode and the catalyst is less than 10 millimeters.

3. The apparatus of claim 2, wherein the distance is less than 1 millimeter.

4. The apparatus of claim 1, wherein the catalyst contacts at least one of the pair of electrodes.

5. The apparatus of claim 1, wherein the catalyst contacts the anode.

6. The apparatus of claim 1, wherein the catalyst is disposed in at least a portion of the substrate support.

7. The apparatus of claim 1, wherein the fuel cell stack, the manifold, and the fuel processor together comprise a volume less than 1 liter.

8. The apparatus of claim 1, wherein the electrolyte has a thickness less than 10 micrometers.

9. The apparatus of claim 1, wherein the catalyst has a first temperature and the electrolyte has a second temperature during operation of the apparatus, and a difference between the first temperature and the second temperature is less than 200 degrees Celsius.

10. The apparatus of claim 9, wherein at least a portion of the manifold has a third temperature during operation, and a difference between the first temperature and the third temperature is less than 200 degrees Celsius and a difference between the second temperature and the third temperature is less than 200 degrees Celsius.

11. The apparatus of claim 1, wherein the manifold includes at least one wall comprising silicon.

12. The apparatus of claim 1, wherein the manifold comprises a flow passage having at least one dimension less than 5 millimeters.

13. The apparatus of claim 1, wherein a substrate defines the manifold.

14. The apparatus of claim 1, wherein the fuel processor comprises a combustor with the catalyst disposed therein.

15. The apparatus of claim 1, wherein the catalyst is disposed within the at least one channel.

16. The apparatus of claim 1, wherein the catalyst comprises copper-samaria-ceria.

17. The apparatus of claim 1, wherein the fuel processor further comprises a porous catalytic membrane disposed adjacent the manifold.

18. The apparatus of claim 1, wherein the manifold comprises the support substrate integrated with the fuel processor.

19. The apparatus of claim 1, further comprising a combustor thermally coupled to the fuel processor, wherein the combustor disposed on the fuel processor and provides sufficient heat for the catalyst to reform the fuel.

20. The apparatus of claim 1, further comprising a combustor thermally coupled to the fuel processor, wherein during operation of the apparatus the combustor has a first temperature and the catalyst has a second temperature, and the combustor is thermally coupled to the fuel processor for the difference between the first temperature and the second temperature to be less than about 200 degrees Celsius.

21. The apparatus of claim 1, further comprising a combustor thermally coupled to the fuel processor, wherein the combustor includes a catalyst material.

22. The apparatus of claim 21, wherein the combustor includes at least one combustor channel and the catalyst material is positioned within the combustor channel.

23. The apparatus of claim 1, further comprising a combustor thermally coupled to the fuel processor, wherein the combustor includes a channel for combining fuel and oxidant and generating heat.

24. The apparatus of claim 1, further comprising a combustor thermally coupled to the fuel processor, wherein the combustor further comprises an electric heater.

25. The apparatus of claim 1, wherein the manifold comprises an etched silicon-containing substrate.

26. The apparatus of claim 1, wherein the substrate support is comprised of at least one of glass, ceramic, metal, or silicon.

27. The apparatus of claim 1, wherein the at least one channel has a diameter of between about 100 micrometers and about 2 millimeters.

28. The apparatus of claim 1, wherein the catalyst includes at least one of PtRu, CuO, Cu—ZnO, alumina, and Ni.

29. The apparatus of claim 1, wherein the electric heater is a resistive heater.

30. The apparatus of claim 29, wherein the resistive heater is a thin film heater.

31. The apparatus of claim 30, wherein the thin film heater is positioned between the cathode and the anode in the fuel cell stack.

32. The apparatus of claim 1, wherein the electric heater is positioned between the cathode and the anode in the fuel cell stack.

33. The apparatus of claim 1, wherein the electrolyte has a thickness less than 10 micrometers, wherein the substrate is comprised of at least one of glass, ceramic, metal, or silicon, and further comprising a combustor thermally coupled to the fuel processor, wherein the combustor further comprises an electric heater.

* * * * *